US012629862B2

(12) United States Patent
Malki

(10) Patent No.: US 12,629,862 B2
(45) Date of Patent: May 19, 2026

(54) METHOD FOR TREATING WOOD AND CONSTRUCTION ELEMENT

(71) Applicant: HOUTINDUSTRIE "MEVO B.V.", Helmond (NL)

(72) Inventor: Raby Malki, Helmond (NL)

(73) Assignee: HOUTINDUSTRIE "MEVO B.V.", Helmond (NL)

( * ) Notice: Subject to any disclaimer, the term of this patent is extended or adjusted under 35 U.S.C. 154(b) by 0 days.

(21) Appl. No.: 18/038,800

(22) PCT Filed: Nov. 25, 2021

(86) PCT No.: PCT/IB2021/060972
§ 371 (c)(1),
(2) Date: May 25, 2023

(87) PCT Pub. No.: WO2022/112992
PCT Pub. Date: Jun. 2, 2022

(65) Prior Publication Data

US 2024/0001584 A1 Jan. 4, 2024

(30) Foreign Application Priority Data

Nov. 25, 2020 (NL) ...................................... 2026974

(51) Int. Cl.
*B27K 3/34* (2006.01)
*B27K 3/02* (2006.01)
(Continued)

(52) U.S. Cl.
CPC ............ *B27K 3/343* (2013.01); *B27K 3/0271* (2013.01); *B27K 3/08* (2013.01); *B27K 3/15* (2013.01)

(58) Field of Classification Search
CPC ........ B27K 3/343; B27K 3/0271; B27K 3/08; B27K 3/15; B27K 3/0278
See application file for complete search history.

(56) References Cited

U.S. PATENT DOCUMENTS 3,183,114 A * 5/1965 Liu .......................... C08H 8/00 428/541
3,537,887 A 11/1970 Blohm
(Continued)

FOREIGN PATENT DOCUMENTS

BE 734797 A 12/1969
CN 109176790 A 1/2019
(Continued)

OTHER PUBLICATIONS

International Search Report corresponding to International Application No. PCT/IB2021/060972 dated Apr. 5, 2022.
(Continued)

*Primary Examiner* — Michael P Wieczorek
(74) *Attorney, Agent, or Firm* — Jenkins, Taylor & Hunt, P.A.

(57) ABSTRACT

In a method for treating wood, wherein a wooden body is impregnated with a polymerizable compound which is polymerizable by oxidation, the polymerizable compound is brought into contact with an oxidizer in the wooden body in order to polymerize the polymerizable compound in situ. The polymerizable compound applied therein comprises a heterocyclic compound with nitrogen and/or sulphur as heteroatom. The oxidizer is brought into solution and the wooden body is saturated with a solution of the oxidizer. The wooden body is subjected to a vapour phase of the heterocyclic compound under an increased pressure and the heterocyclic compound is polymerized in situ in the wood.

17 Claims, 1 Drawing Sheet

Figure 1:
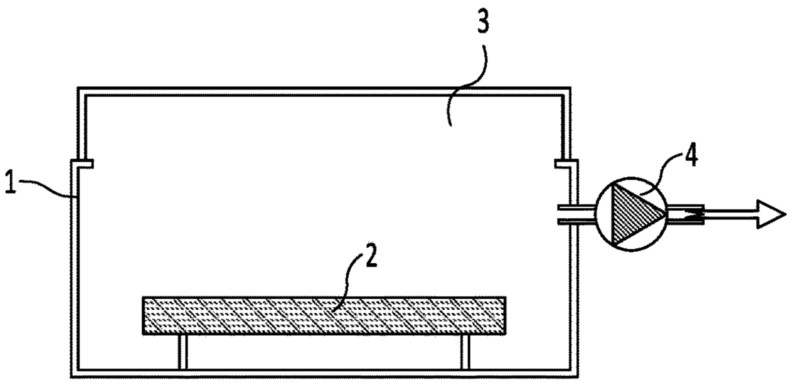
Figure 2:
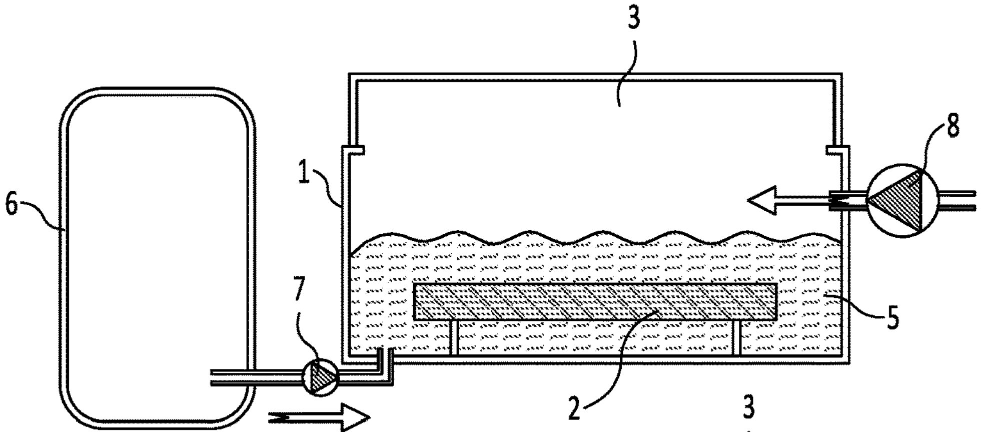

(51) Int. Cl.
*B27K 3/08* (2006.01)
*B27K 3/15* (2006.01)

(56) References Cited

U.S. PATENT DOCUMENTS

| | | | | |
|---|---|---|---|---|
| 3,579,369 | A | 5/1971 | Foster | |
| 5,024,861 | A * | 6/1991 | Vinden | B27K 3/163 427/393 |
| 8,178,211 | B2 * | 5/2012 | Eversdijk | B27K 3/15 427/393 |

FOREIGN PATENT DOCUMENTS

| | | | |
|---|---|---|---|
| EP | 2114643 | A1 | 11/2009 |
| WO | WO 2008/072967 | A1 | 6/2008 |
| WO | WO 2015/154635 | A1 | 10/2015 |

OTHER PUBLICATIONS

IPRP and Written Opinion corresponding to International Application No. PCT/IB2021/060972 dated May 30, 2023.
Search Report corresponding to Dutch Application No. 2026974 dated Jun. 25, 2021 [with machine translation].
Office Action (Communication pursuant to Article 94(3) EPC) corresponding to European Patent Application No. 21 840 115.6-1014 dated Jun. 30, 2025, 3 pages.

* cited by examiner

METHOD FOR TREATING WOOD AND CONSTRUCTION ELEMENT

CROSS REFERENCE TO RELATED APPLICATIONS

This application is a national stage filing of PCT International Application No. PCT/IB2021/060972, filed Nov. 25, 2021, which is based on and claims priority to Netherlands Patent Application No. 2026974, filed Nov. 25, 2020, the disclosure of each of which is incorporated herein by reference in its entirety.

The present invention relates to a method for treating wood, wherein a wooden body is impregnated with a polymerizable compound which is polymerizable by oxidation and the polymerizable compound is brought into contact with an oxidizer in the wooden body in order to polymerize the polymerizable compound in situ, wherein the polymerizable compound comprises a heterocyclic compound with nitrogen and/or sulphur as heteroatom.

For various reasons it is desirable in some cases to treat wood before structural or other use thereof. It is thus sometimes desirable to colour wood by applying a suitable colorant thereto or therein. A treatment with a suitable compound can also improve determined properties of the wood, such as its microbiological resistance, durability, combustion properties and/or moisture resistance.

A treatment which has been found to be particularly advantageous in practice is an impregnation of the wood with a polymerizable compound which is polymerizable by oxidation. This treatment is for instance known from European patent application EP 2.114.643. This describes a treatment in which a polymerizable compound is brought into contact with an oxidizer in the wooden body in order to polymerize the polymerizable compound in situ. In this known method the applied polymerizable compound comprises a heterocyclic compound with nitrogen and/or sulphur as heteroatom. This is particularly a pyrrole which has proven in practice to be effective in respect of durably colouring softwood and making it weather-resistant.

In the known method the wooden body to be treated is immersed in a bath of an iron(III) chloride solution at a temperature of 20° C. for a twenty-four hour period, after which the wooden body is placed in a 5% aqueous pyrrole solution under the same conditions. Each of these steps can optionally be preceded by subjecting the wooden body for 20 to 120 minutes to an underpressure (vacuum) and then an increased pressure so as to allow the two impregnating agents to penetrate more deeply.

The wood treated in this way has an attractive deep black shade which remains stable for years and has been found to be resistant to prevailing weather influences to increased extent. A drawback of the known method is however the amount of time required to allow the oxidizer and the polymerizable compound to penetrate. The penetration depth of the polymerizable compound has moreover been found to be limited, even after several twenty-four hour periods have passed, because continuing diffusion of the pyrrole solution is counteracted by the polypyrrole which has by now polymerized and become anchored in the wood. It is especially when the wooden body is cut across the grain that this results in a vulnerable wood surface.

The present invention has for its object, among others, to provide a method for treating wood with a heterocyclic compound which obviates this to at least significant extent. In order to achieve the stated object a method of the type described in the preamble has the feature according to the invention that the wooden body is impregnated with the oxidizer, that the wooden body impregnated with the oxidizer is subjected to a vapour phase of the heterocyclic compound under an increased pressure, and that the heterocyclic compound is polymerized in situ in the wooden body under the influence of the oxidizer. The invention is here based on the insight that the solubility of such a heterocyclic compound in water, particularly of pyrrole, is relatively limited, whereby a concentration thereof is usually not higher than the 5% applied in the known method. By providing the heterocyclic compound in the gas phase the wood can be exposed to a considerably higher concentration of the heterocyclic compound.

This vapour phase furthermore penetrates deep into the material of the wooden body, where the oxidizer already introduced there will initiate the intended polymerization. A particular embodiment of the method has the feature here according to the invention that the oxidizer is brought into solution and the wooden body is saturated with a solution of the oxidizer. In solution, the oxidizer has been found to be particularly effective in initiating the polymerization of the heterocyclic compound. It is suspected that this is a result of the homogenous distribution and thereby optimal accessibility of the oxidizer in solution.

In the vapour phase the heterocyclic compound seeks a gas-gas equilibrium with water vapour present in the reactor space, which can be boosted to a considerably higher concentration of the active substance. The higher concentration of the active substance results in a steeper gradient and thereby stronger diffusion in the wooden body. The heterocyclic compound furthermore has an increased mobility in the gas phase anyway, which contributes further to a more rapid and deeper penetration into the wooden body. It has been found that the wood treated in this way already displays a considerably deeper discolouration in a fraction of the treatment duration of the known method, indicating that the polymerization has penetrated further therein.

Good results can be achieved with a particular embodiment of the method according to the invention characterized in that the heterocyclic compound is selected from a group comprising optionally substituted pyrrole, thiophene, pyridine, quinoline, diazine and combinations thereof. In this respect a preferred embodiment of the method has the feature according to the invention that the heterocyclic compound comprises optionally substituted pyrrole with a structure according to the formula:

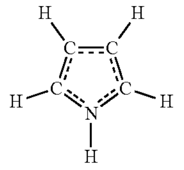

wherein all carbon-bonded hydrogen atoms can each individually be substituted with a residual group selected from: OH, NH2, carboxyl, aldehyde, methyl, ethyl, propyl, phenyl and benzyl, and wherein in particular the heterocyclic compound is taken from a group comprising: pyrrole, 1-methylpyrrole, 2,5-dimethylpyrrole, 1,2,5-trimethylpyrrole, 2-acetylpyrrole, 2-acetyl-1-methylpyrrole, pyrrole-2-carboxaldehyde, 1-methyl-2-pyrrolecarboxaldehyde and combinations thereof. Pyrrole and such pyrrole derivatives as heterocyclic compound polymerize into polypyrrole, which gives the wood an attractive deep black colour and imparts an excellent durability thereto.

A further penetration of the active substance into the wooden body is advanced by a further preferred embodiment of the method which is characterized according to the invention in that the wooden body is subjected to the vapour phase of the heterocyclic compound at an increased atmospheric pressure, particularly at a pressure of between 1.2 and 2.5 MPa. This overpressure treatment can optionally be preceded by an underpressure in order to increase a receptiveness of the wooden body to the heterocyclic compound.

For a heterocyclic compound which is not already gaseous at room temperature a particular embodiment of the method has the feature according to the invention that the heterocyclic compound is brought into the vapour phase by heating a liquid containing the heterocyclic compound to a boiling point of the heterocyclic compound. More particularly, a further embodiment of the method has the feature here according to the invention that the heterocyclic compound comprises pyrrole and the liquid is heated to a temperature above 100° C., particularly to around 125° C. Pyrrole has a boiling point of about 129° C. By heating the liquid containing pyrrole to roughly this temperature pyrrole will escape therefrom and the thus formed vapour can be carried to the wooden body, optionally in forced manner.

Even an aqueous solution with a modest pyrrole content provides a concentrated vapour phase so that the above stated limitation of the known process does not impede the method, or at least does so to lesser extent. A preferred embodiment of the method has the feature however that undiluted pyrrole or a solution of pyrrole in water is used for the liquid. Pyrrole is liquid at room temperature and can therefore be applied in undiluted, pure form for being heated to said temperature. Pyrrole is dissolvable in oil, particularly in linseed oil, to a high concentration so that a solution of pyrrole in oil can advantageously be applied. This furthermore results in an increased stability of the naturally reactive pyrrole.

In respect of the oxidizer there are several suitable candidates. In a further preferred embodiment the method has in this respect the feature however that a water-soluble oxidizer was applied, which was brought into an aqueous solution. The water serves here as a means of transport into the wooden body, so that the oxidizer can penetrate deeply. The oxidizer is thus already situated in situ in the wood cells before the wood is exposed to the heterocyclic compound. The intended in situ polymerization can hereby be achieved deep into the wood. A preferred embodiment of the method has the feature here according to the invention that the wooden body is dried at most partially before being subjected to the vapour phase of the heterocyclic compound, particularly by applying an underpressure therearound. At least a part of the moisture thus remains present in the wood cells and the oxidizer in solution, rather than precipitating. It has been found that an increased reactivity with the heterocyclic compound is preserved thereby.

Various compounds are per se suitable as oxidizer for in situ polymerization of the heterocyclic monomer. In this respect a particular embodiment of the method has the feature according to the invention that the oxidizer is taken from a group comprising: iron(III) chloride, sodium persulphate, ammonium cerium(IV) nitrate, oxygen, 2,2'-azobis (2-methylpropionitrile) and combinations thereof, and particularly comprises iron(III) chloride.

The treatment according to the invention gives the wooden body an attractive deep black appearance which penetrates deep into the wooden body and is preserved even after prolonged exposure to weather conditions, and which does not leach, or hardly so. In addition, the treatment results in protection of the wood. A further particular embodiment of the method according to the invention therefore has the feature that the wooden body comprises softwood, particularly pine or spruce. The utility of some types of softwood, such as spruce and pine, which are used structurally on a large scale, can thus be expanded significantly to include for instance outdoor applications for which considerably more expensive types of hardwood have usually been applied up to this point.

The invention also relates to a construction element comprising a wooden body which was treated in accordance with the method according to the above described invention. The invention will be further elucidated hereinbelow with reference to an exemplary embodiment and to a drawing. In the drawing:

FIGS. 1-4 show an embodiment of the method according to the invention in successive stages.

It is noted here that the figures are purely schematic and not drawn to scale. Some dimensions in particular may be exaggerated to greater or lesser extent for the sake of clarity. Corresponding parts are generally designated in the figures with the same reference numeral.

The setup of FIG. 1 comprises a reactor 1 in which one or more wooden bodies 2 to be treated can be accommodated. In this case these are one or more planks or beams of softwood, in this case spruce or pine. After wooden parts 2 have been placed into reactor space 3, the reactor space is hermetically sealed in vacuum-tight manner. Air is then extracted from space 3 with a vacuum pump 4 and the whole is placed under an underpressure. Air will here also be extracted from and from between the wood cells of wooden parts 2, whereby the wood becomes more receptive to penetration and absorption of an oxidizer to be introduced therein.

In respect of the oxidizer, in this example a 5-10% aqueous solution 5 of iron(III) chloride is resorted to. The solution is prepared beforehand and is carried from a supply container 6 into reactor space 3 by means of a pump unit 7 and conduit system, wherein the underpressure in reactor space 3 is also relieved. Instead, the oxidizer solution can optionally also first be composed in reactor space 3 by letting the iron(III) chloride salt and water therein separately and mixing them. And instead of iron(III) chloride, other compounds (salts) are also suitable as oxidizer within the scope of the method described here, such as for instance an aqueous solution of sodium persulphate, ammonium cerium (IV) nitrate, 2,2'-azobis(2-methylpropionitrile) and combinations thereof or therewith. A gaseous oxidizer, such as for instance oxygen, can also be applied as polymerization initiator for the heterocyclic compound.

The iron (III) chloride solution is held at a temperature of about 20 to 60° C. For this purpose reactor 2 is provided with heating means (not further shown) and a thermostatic control. In addition, the reactor space is brought to an overpressure in the order of 1.2 to 2.5 MPa with a pump 8 provided for this purpose. In this example an overpressure of about 1.5 MPa is applied in that respect in order to advance penetration of iron (III) chloride into the wood. Wooden body 2 is subjected thereto for a duration of a minimum of several minutes to several hours, wherein the iron (III) chloride solution is able to penetrate deep into the core of the wood 2, see FIG. 2.

Figure 3:
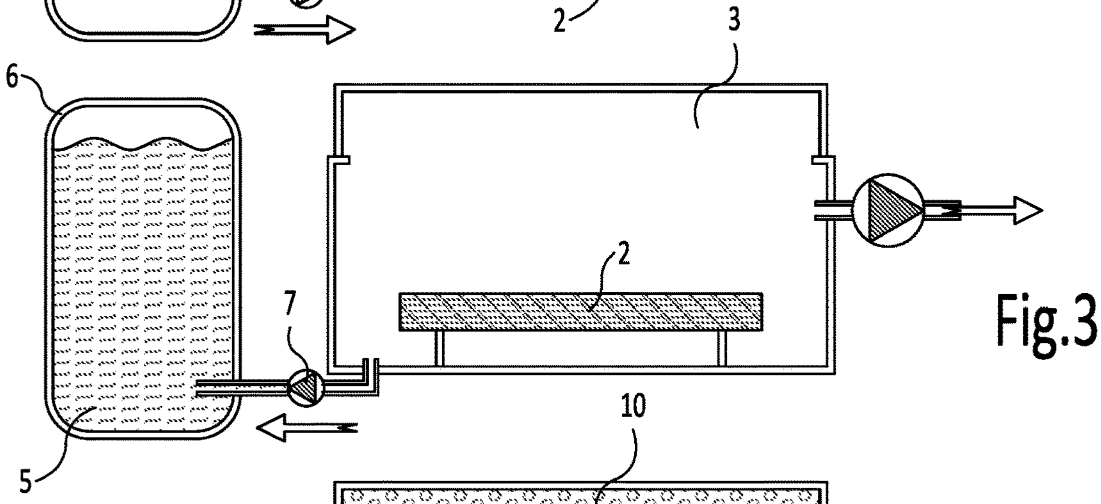
Figure 4:
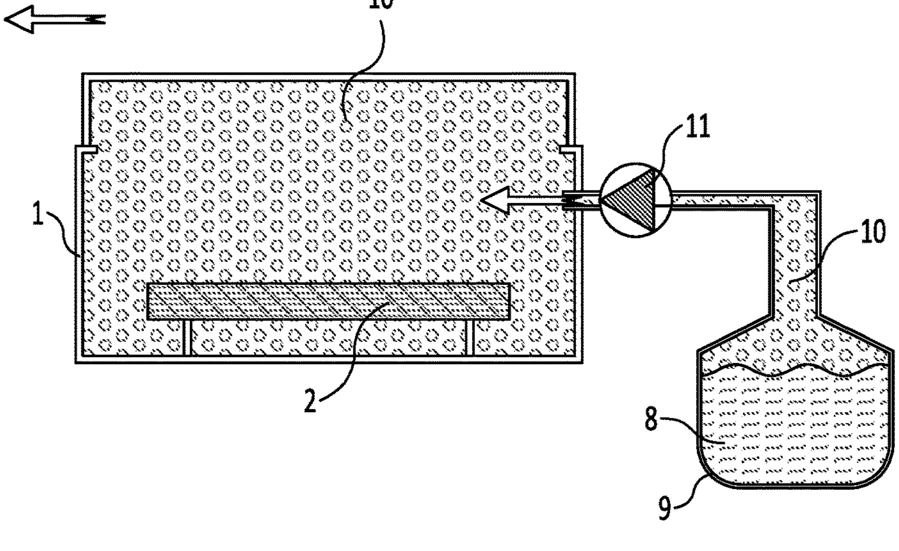

After the above described deep doping with iron(III) chloride the reactor space is emptied by pumping, see FIG. 3, using the pump unit 7 and the overpressure prevailing therein. The reactor space 3 is evacuated once again with vacuum pump 4 in order to remove any excess water vapour, and an underpressure is once again created therein. The reactor space is now coupled to a heated thermostatic bath 8 of liquid pyrrole which is held at a temperature of about 125° C. in a tank 9, see FIG. 4. Pyrrole hereby escapes in the vapour phase 10, which is pumped out with a pump 11 provided for this purpose and is carried under a pressure of 1.2-2.5 MPa into reactor space 3. In this example reactor space 3 is held at a pressure of about 1.8 PMa.

This state is maintained for a duration of 1 to 48 hours, wherein the pyrrole vapour 10 penetrates deep into the wood 2 and therein undergoes an in situ polymerization into polypyrrole under the influence of the iron(III) chloride present therein. The wood 2 is preferably still humid to some extent here as a result of the iron(III) chloride bath, so that the oxidizer in the cells is in solution and the pyrrole in solution reacts with the iron(III) chloride.

The treatment described here gives the wood a deep black colour and furthermore imparts a particularly effective weather resistance. The lifespan of the softwood with naturally limited durability and low weather resistance can thereby be increased substantially to or even beyond the level of types of tropical hardwood frequently used in structures. Not only does this result in a cost saving, it also has a positive effect on nature because hardwood logging can thus be reduced. Wooden body 2 is now suitable as or for a construction element, both for indoor and outdoor use.

Although the invention has been further elucidated on the basis of only this exemplary embodiment, it will be apparent that the invention is by no means limited thereto. On the contrary, many variations and embodiments are still possible within the scope of the invention for a person with ordinary skill in the art. The described in situ polymerization is thus also possible with alternative pyrrole derivatives, such as for instance particularly 1-methylpyrrole, 2,5-dimethylpyrrole, 1,2,5-trimethylpyrrole, 2-acetylpyrrole, 2-acetyl-1-methylpyrrole, pyrrole-2-carboxaldehyde, 1-methyl-2-pyrrolecarboxaldehyde and combinations thereof, optionally using iron(III) chloride or a different oxidizer. Other heterocyclic compounds, such as thiophene, pyridine, quinoline, diazine, are also suitable as polymerizable compound which, with a suitable oxidizer which was introduced into the cells of the wood beforehand, will undergo according to the invention an in situ polymerization deep into the wood from the vapour phase.

The invention claimed is:

1. A method for treating wood, wherein a wooden body is impregnated with a polymerizable compound which is polymerizable by oxidation and the polymerizable compound is brought into contact with an oxidizer in the wooden body in order to polymerize the polymerizable compound in situ, wherein the polymerizable compound comprises a heterocyclic compound with nitrogen and/or sulphur as hetero-atom, the method comprising:

bringing said heterocyclic compound into a vapor phase by heating a liquid containing said heterocyclic compound to a boiling point of the heterocyclic compound;

impregnating the wooden body with the oxidizer as a liquid to provide an impregnated wooden body; and subjecting the impregnated wooden body to an underpressure and, subsequently, to said vapour phase of the heterocyclic compound under an increased pressure, wherein the heterocyclic compound is polymerized in situ in the wooden body under the influence of the oxidizer.

2. The method according to claim 1, wherein impregnating the wooden body with the oxidizer as a liquid comprises bringing the oxidizer into solution and saturating the wooden body with a solution of the oxidizer.

3. The method according to claim 1, wherein the heterocyclic compound is selected from the group consisting of optionally substituted pyrrole, thiophene, pyridine, quinoline, diazine and combinations thereof.

4. The method according to claim 3, wherein the heterocyclic compound comprises optionally substituted pyrrole with a structure according to the formula:

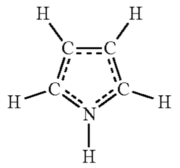

wherein all carbon-bonded hydrogen atoms can each individually be substituted with a residual group selected from: OH, $NH_2$, carboxyl, aldehyde, methyl, ethyl, propyl, phenyl and benzyl.

5. The method according to claim 4, wherein the heterocyclic compound is taken from the group consisting of: pyrrole, 1-methylpyrrole, 2,5-dimethylpyrrole, 1,2,5-trimethylpyrrole, 2-acetylpyrrole, 2-acetyl-1-methylpyrrole, pyrrole-2-carboxaldehyde, 1-methyl-2-pyrrolecarboxaldehyde and combinations thereof.

6. The method according to claim 1, comprising subjecting the wooden body to the vapour phase of the heterocyclic compound at an increased atmospheric pressure.

7. The method according to claim 6, wherein said pressure is between 1.2 MPa and 2.5 MPa.

8. The method according to claim 1, wherein the heterocyclic compound comprises pyrrole and the liquid is heated to a temperature above 100° C.

9. The method according to claim 8, wherein undiluted pyrrole or a solution of pyrrole in water is used for the liquid.

10. The method according to claim 9, wherein the wooden body is dried at most partially before being subjected to the vapour phase of the heterocyclic compound.

11. The method according to claim 10, wherein the wooden body is dried at most partially before being subjected to the vapor phase of the heterocyclic compound by applying said underpressure therearound.

12. The method according to claim 8, wherein the liquid is heated to a temperature of around 125° C.

13. The method according to claim 1, wherein impregnating the wooden body with the oxidizer as a liquid comprises applying a water-soluble oxidizer, which has been brought into an aqueous solution.

14. The method according to claim 13, wherein the oxidizer is taken from the group consisting of: iron (III) chloride, sodium persulphate, ammonium cerium (IV) nitrate, oxygen, 2,2'-azobis(2-methylpropionitrile) and combinations thereof.

15. The method according to claim 14, wherein the oxidizer comprises iron (III) chloride.

16. The method according to claim 1, wherein the wooden body comprises softwood.

17. The method according to claim 16, wherein the softwood comprises pine or spruce.

* * * * *